Sept. 22, 1953     RENÉ LUCIEN LEVY     2,653,021
ALSO KNOWN AS
RENÉ LUCIEN
OLEO-PNEUMATIC SUSPENSION SYSTEM FOR
AUTOMOBILES AND LIKE VEHICLES
Filed Feb. 20, 1948     2 Sheets-Sheet 1
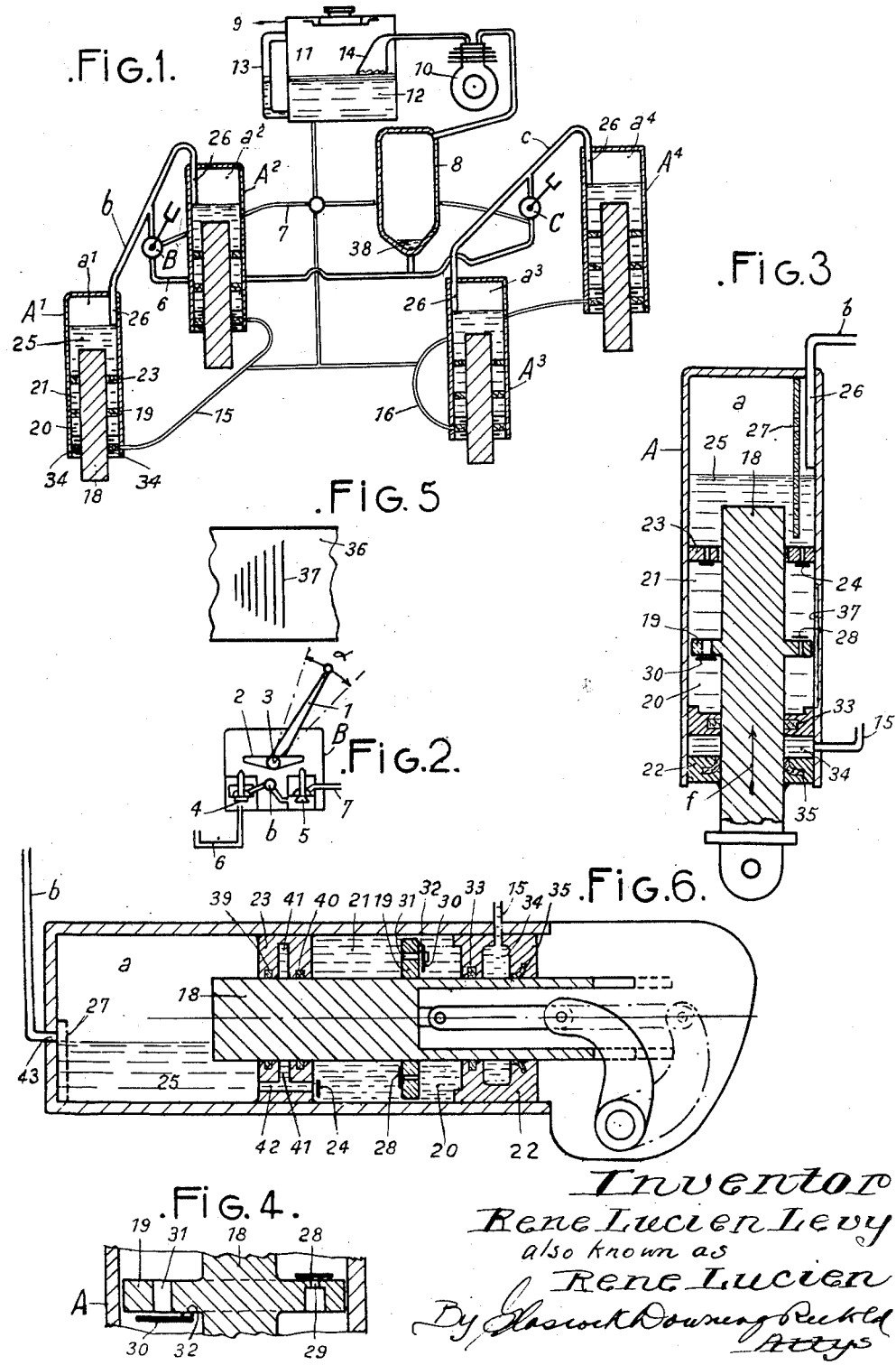
Inventor
Rene Lucien Levy
also known as
Rene Lucien
By Hascock Downing Rockel
Attys Sept. 22, 1953

RENÉ LUCIEN LEVY
ALSO KNOWN AS
RENÉ LUCIEN
OLEO-PNEUMATIC SUSPENSION SYSTEM FOR
AUTOMOBILES AND LIKE VEHICLES 2,653,021

Filed Feb. 20, 1948

INVENTOR
Rene Lucien Levy
also known as
Rene Lucien
ATTORNEYS

Patented Sept. 22, 1953

2,653,021

UNITED STATES PATENT OFFICE 2,653,021

OLEO-PNEUMATIC SUSPENSION SYSTEM FOR AUTOMOBILES AND LIKE VEHICLES

René Lucien Levy, also known as René Lucien, Paris, France, assignor to Societe d'Inventions Aeronautiques et Mecaniques S. I. A. M., Geneva, Switzerland, a corporation of Switzerland Application February 20, 1948, Serial No. 9,868
In France February 26, 1947

14 Claims. (Cl. 267—64)

Resilient suspensions for automobile vehicles are known which operate by purely pneumatic means and which essentially comprise four pneumatic cylinders which are secured to the chassis of the vehicle and in each of which is adapted to move a piston, the rod of which is connected either to the front or the rear axle, one of the chambers of each cylinder being adapted to be placed in communication with a compressed air reservoir, whereas the other chamber is directly connected or not to the atmosphere, the compensation for the losses and for the variations of pressure which follow the variations of the load being effected by supply and exhaust devices.

In particular, pneumatic suspensions for vehicles are known which have the following features:

1. Automatic adjustment of the horizontality of the vehicle according to the load thereon;
2. Automatic inflation of the pneumatic cylinders and lubrication of same by means of an air and oil circulation in a closed circuit;
3. Combination of the pneumatic suspension with one or a plurality stabilizing-restoring systems which are independent of the pneumatic suspension and are capable of maintaining parallelism between the chassis and each of the axles, said systems forming anti-rolling devices which are in general metallic and which provide a transverse flexibility that can be expressed by a linear diagram, whereas the longitudinal flexibility, which is provided by the action of the compressed air, consequently corresponds to a hyperbolic diagram.

Such pneumatic suspension systems are described in the following French patents: No. 523,889 of February 10, 1920; No. 563,913 of June 30, 1922; No. 566,130 of July 31, 1922; No. 637,592 of November 9, 1926: all in the name of George Messier.

The present invention consists, in the first place, in the combination of the pneumatic suspension systems of this type with hydraulic shock-absorbers which are incorporated in the pneumatic cylinders in such a manner as to form an oleo-pneumatic suspension, this being effected under such conditions that the arrangement which effects the automatic adjustment of the suspension according to the load also operates as a regulator for the level of the liquid in said cylinders.

A second object of the invention consists in the combination of said oleo-pneumatic suspensions with the devices described in the French patent application filed by the present applicant under Serial No. 530,327, for "Protected Fluid-Tight Packings for Shock-absorbers, Suspensions or Hydraulic Jacks and the Like," on February 24, 1947, now issued as French Patent No. 943,120.

This combination not only provides constant lubrication of the fluid-tight packings, but also if desired a sufficient temporary protection to guarantee the substantially normal operation of the suspension in the case in which one of the fluid-tight packings fails.

Fig. 1 of the accompanying drawing illustrates diagrammatically an example of an oleo-pneumatic suspension system according to the invention;

Fig. 2 shows diagrammatically a distributor;

Fig. 3 shows a longitudinal section of one of the oleo-pneumatic cylinders of this suspension;

Fig. 4 is a partial section, on a larger scale, corresponding to the previous one;

Fig. 5 shows a detail of construction of the cylinders;

Fig. 6 shows a longitudinal section of a modification of the oleo-pneumatic cylinders in the case in which they are horizontal, in order to enable particularly advantageous embodiments to be obtained on automobiles;

Figure 7:
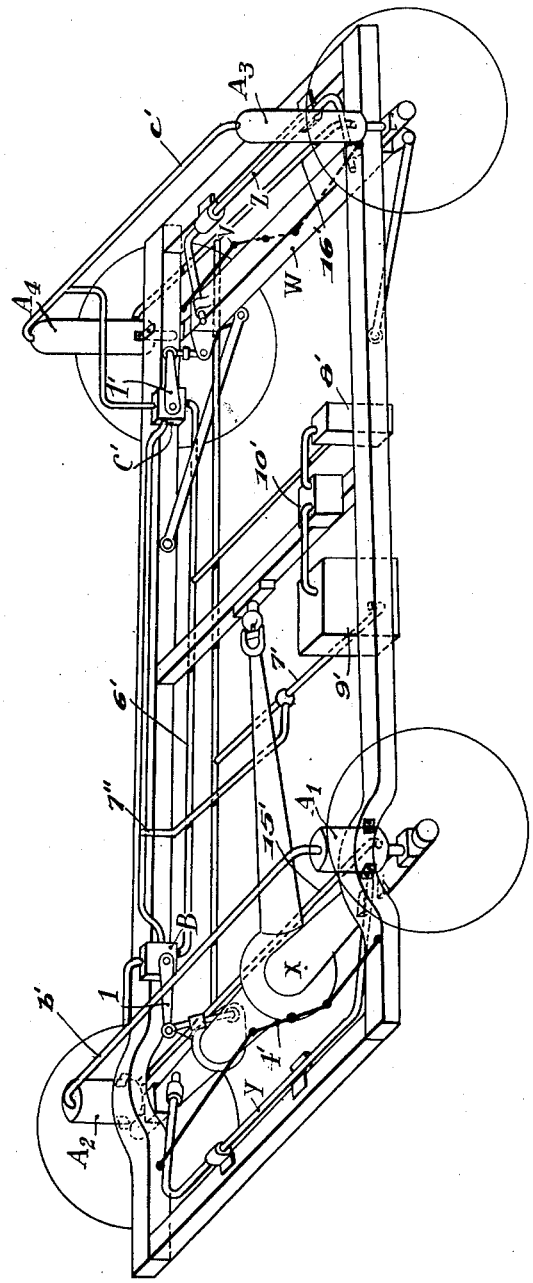

Figure 7 diagrammatically illustrates a vehicle chassis embodying front and rear load stabilizers and their relationship to the control means of the oleo-pneumatic system of the invention.

Fig. 1 shows some of the basic elements of the suspensions of the type in question, but combined with the means according to the invention.

In this example, the suspension comprises four cylinders, viz. two rear cylinders $A1$—$A2$ and two front cylinders $A3$—$A4$. The rear cylinders $A1$—$A2$ are assumed to be combined with a metal anti-roll device (not shown) and so is the front pair $A3$—$A4$.

Each cylinder has at its upper part a chamber $a_1$ to $a_4$ containing compressed air, connections $b$ and $c$ being respectively provided between the chambers $a_1$ and $a_2$ and between the chambers $a_3$ and $a_4$.

The inlet of the compressed air to each pair of cylinders is controlled by the action of a distributor $B$ for the pair $A1$—$A2$ and a distributor $C$ for the pair $A3$—$A4$.

Each distributor, for example the distributor $B$ shown in Fig. 2, is actuated by a lever $I$ adapted to be connected to a reciprocating link operated by the corresponding load stabilizer.

Said lever actuates a rocker $2$ which is adapted to rock about a pivot $3$ and which can alternately engage the stems of valves $4$ and $5$ respectively which, when open, connect he inter-communication pipe, in this case $b$, to one or other of the pipes 6 and 7 which are respectively the pressure pipe and the exhaust pipe and are respectively connected to a pneumatic accumulator 8 and to a tank 9, which forms a fluid reservoir. So long as the mean oscillation of the wheel-train remains smaller than a normal value for a predetermined load, the oscillation of the lever 1 itself remains smaller than the angle $a$ and the rocker 2 does not engage the valves 4 and 5 which remain closed. On the other hand, an overload of the vehicle has the effect of shifting the mean point of oscillation of the lever 1 towards the left, a sufficient amount for the valve 4 to open and thereby enable pressure air to penetrate temporarily into the pair of cylinders controlled by this distributor.

Conversely, if the load on the vehicle is lightened, the valve 5 opens and causes the pair of cylinders to be placed temporarily in communication with the return pipe to the tank.

In other words, the presence of the anti-roll or equivalent devices enables the distributors B and C and consequently the supply to the cylinders, to be controlled by means of members which, relatively to the rear or front wheel-trains, respectively effect a movement equal to the mean movements of said wheel-trains. An equivalent suspension has already been described in some of the aforesaid Messier patents.

By the action of the compressor 10, the accumulator 8 is adjusted so that a certain pressure is always maintained therein. Said compressor sucks air from the chamber 11 above the liquid 12 of the tank 9, which is provided with a gauge 13 for checking the level of the liquid. This suction is effected by means of a snifter 14 provided with a large opening which is flush with the level of the liquid and may advantageously have a serrated contour.

To the tank 9, in addition to the pipes 7, other pipes 15—16 are connected, the function of which will become apparent from the ensuing description of the suspension members combined with the oleo-pneumatic shock-absorbers.

Each of the combined members, which are generically denoted by A in Fig. 3, essentially comprises a cylinder in which a plunger piston rod 18 is adapted to move, said rod being provided with a flange 19 which itself forms a piston which slides with a running fit in the cylinder and divides it into two chambers 20—21 respectively of variable volumes, from one to the other of which can move a predetermined quantity of liquid confined between the stuffing-box 22 of the rod 18 and a diaphragm 23 secured to the cylinder.

A valve 24 controls the re-filling of this chamber with oil by means of an excess quantity of oil 25 resting on the diaphragm 23.

The features of the shock-absorber itself are as follows:

1. The automatic adjustment of the oil level is obtained by means of a plunger tube 26, as will be explained hereinafter. Said plunger tube, which extends the pipe $b$ or $c$ of Fig. 1, is preferably protected by a foraminous deflector 27 which is adapted to damp, adjacent the plunger tube, the oscillations imparted to the liquid 25 by the movement of the vehicle.

2. The flange 19 is provided with two valves (Fig. 4), one, 28, which during the compression stroke of the rod 18 (arrow $f$) closes an orifice 29 with thin walls and uncovers said orifice to enable the liquid to flow during the expansion stroke; the other, 30, which during the compression stroke effects a braking action on the liquid proportional to the speed of said liquid.

This peculiarity of the action of the valve 30 is obtained by using the means described in French patent application Serial No. 530,258 of February 22, 1947 for "Hydraulic Shock-Absorbers," in the name of the present applicant. This French application has now matured into French Patent No. 942,419. Consequently, the valve 30 of springy steel is located opposite an opening 31 which is comparatively large. Furthermore, it is so mounted as to retain permanently a continuity of the liquid mass between the chambers 20 and 21, owing to the presence of a small wedge 32 which prevents it from completely adhering to said opening.

3. The stuffing-box 22 is provided with a device for automatically lubricating the packing, of the type of that described in French Patent No. 943,120 for "Protected Fluid-Tight Packings for Hydraulic Shock-Absorbers, Suspensions or Jacks and the Like." It therefore comprises a main packing 33, a lubricating chamber 34 filled with oil which effects a permanent lubrication of the lower face of said main packing and an auxiliary packing 35 which retains the oil in said chamber. According to one feature of the present invention, the lubricating chambers 34 of the shock-absorbers A1 to A4 all communicate with one another and with the liquid 12 of the tank 9 through the pipes 15—16; said tank thus performs the function of the auxiliary reservoir provided in the aforesaid patent application and, in the event of the packings leaking, the liquid returns to said tank.

4. The inner wall 36 of the cylinder (Fig. 4) is provided with grooves of decreasing depth 37 which make it possible to adjust the passage offered to the liquid according to the extent to which the plunger piston is inserted and proportionally to a predetermined law.

The mode of operation of this complete oleo-pneumatic suspension arrangement is as follows:

It will be assumed that initially the vehicle is stationary, the plunger tubes, the pistons and the levels of the liquid in the four cylinders A1 to A4 being kept in the mean position owing to the adjustment effected for a certain load.

If the load on the vehicle is increased, the distributors B and C open the valves 4 and admit to the chambers $a1$ to $a4$ an additional amount of compressed air at the pressure prevailing in the accumulator 8. If at this instant a small quantity of liquid, such as 38, is present at the bottom of said accumulator, it is first forced into the cylinders, the inflation of which then continues with compressed air.

If, on the contrary, a decrease of the load occurs, this causes one shock-absorber cylinder or a pair of cylinders to be lifted, thereby operating the distributor B or C and opening the corresponding valve 5 which causes the pressure in the shock-absorber or shock-absorbers to be exhausted through the corresponding plunger tubes 26 towards the tank 9. More accurately: if at the instant in question and owing to an excess of liquid in the shock-absorber, the opening of the plunger tube 26 is immersed in the liquid 25, the exhaust will start with said liquid and will then continue with the air of the chamber $a$, but the excess of liquid will first have been exhausted towards the tank.

It may be assumed that owing to the oscillations of the vehicle, the level of the liquid 25 has become abnormally low in the shock-absorbers, since an excessive quantity of liquid has been exhausted towards the tank; in this case, owing to the fact that the total volume of the liquid of the equipment operates in a closed circuit, an abnormal increase will occur in the quantity of liquid 12 in the tank, and the level of said liquid will therefore rise.

Consequently, the serrated opening of the snifter 14 will be substantially at that level and its serrations will be partially immersed in the liquid so that the compressor 10 will suck in air highly emulsified with oil and not pure oil. After compression, the oil is deposited at 38 in the accumulator 8, so that when pressure is next admitted to the cylinders, this oil will be re-injected therein and will complete the levels of the liquid layers 25 therein.

It will be seen that this system, although it does not effect at every instant a systematic adjustment of the level of the liquid in the shock-absorber cylinders, nevertheless makes it possible, during the successive actions that take place in said cylinders, to obtain automatically a mean level within limits which are compatible with a satisfactory operation of the whole arrangement, this being for the greater part due to the fact that the device operates in a closed circuit. Said closed circuit makes it possible, in particular, to compensate for the possible failure of one of the packings of the shock-absorbers, by effecting a permanent re-inflation of the shock-absorber affected by this incident.

The horizontal shock-absorber device shown in Fig. 6, which is particularly suitable for application to automobiles, is evolved from the same principle as the previous device and can also be incorporated in a similar suspension arrangement to the one just described.

In this figure, the members already described with reference to the previous figures have been denoted by the same reference numerals.

Compared to the vertical cylinder, this device is distinguished by the fact that the diaphragm 23 is provided with two packings 39—40 separated by an annular cavity 41 which is connected, through the duct 42 to the liquid 25 in the air chamber of the shock-absorber. This arrangement is intended to effect the lubrication and therefore the satisfactory preservation of the packing 40 since said packing has to remain fluid-tight for the oil chamber formed by the chambers 20 and 21 to remain full and for the compressed air to remain in the chamber $a$ which is allotted to it, without infiltrating into the other two.

Now, the pressure in the cavity 41 is necessarily lower than or equal to the pressure at $a$. If it is equal to it, the pressure at $a$ cannot penetrate into the cavity 41 since in order to do so it would have to pass through the packing 39. If, on the other hand, it is lower than the pressure at $a$, the liquid 25 passes through the duct 42 and fills said cavity 41, thereby correctly lubricating the packing 40 on the left-hand face thereof which, without this artifice, would not be lubricated.

As in the previous case, the valve 24 controls the refilling of the chambers 20—21. On the other hand, the opening 43 in this case performs the function of the plunger tube in the vertical piston shock-absorbers.

With reference to Figure 7, diagrammatically illustrating the invention with particular reference to front and rear load stabilizers and their relationship to the control means there are shown the cylinders $A_1$ and $A_2$ associated with the rear wheels and the cylinders $A_3$ and $A_4$ associated with the front wheels. A piston in each of these cylinders is movable under the influence of load conditions of the vehicle since the piston rods are connected to the respective rear and front axle members designated generally at X and W. The distributors B' and C' are similar to the embodiment of Figures 1 and 2 and are respectively associated with the rear and front axle assemblies and each include a lever arm 1. The distributors are rigid with the chassis and the lever arms 1' are pivotally connected to the non-suspended portion of the vehicle through linkage. The anti-rolling systems, that is the rear and front load stabilizers, include a rear torsion bar Y bent at its opposite ends connected at its intermediate portion to the rear of the chassis and at its ends to the rear axle assembly X. A similar torsion bar Z is similarly mounted with respect to the front suspension arrangement W.

The drawing further illustrates at V another pivoted stabilizing system for the front of the vehicle consisting of a lever fulcrumed at its middle about a horizontal axis lying in the median plane of the vehicle and connected by two links to the side frame members of the chassis. A similar system 4' is associated with the rear axle assembly. As indicated, the cylinders $A_1$, $A_2$, $A_3$ and $A_4$ respectively receive separate masses of liquid and air under pressure and have a predetermined liquid level therein corresponding to an assumed normal load as described with reference to Figures 1 to 6. A reservoir or tank 9' receives liquid and air. An accumulator 8' also receives liquid and air and conduit means extend between the reservoir and the accumulator and include a compressor or pump means 10'. Further conduit means $b'$ and $c'$ are connected respectively to and extend within the pairs of cylinders for the rear wheels and the front wheels respectively. These conduits $b'$ and $c'$ are respectively in communication with the distributors B' and C'. Each distributor is further in communication with the accumulator through conduit system 6' and the reservoir or tank 9' is in communication with the lower end of each cylinder through conduits 15' and 16' respectively connecting the cylinders at the rear and front wheels and conduit system 7' which further includes a branch portion 7'' communicating with the other distributors. The operation of this arrangement is similar to the operation of the arrangement described in Figure 1.

It is therefore clear that this invention provides a combination liquid-pneumatic suspension system for motor vehicles and includes a plurality of cylinders. There is a piston in each cylinder that is movable under the influence of load conditions of the vehicle. The cylinders receive separate masses of liquid and air under pressure from a common pressurized source of supply for the liquid and air. A fluid circuit including the cylinders, the source of supply and conduit means provides communication between the source of supply with the conduits connected respectively to the cylinders and extending inwardly thereof and approximately to the liquid level. The pistons in the cylinders subdivide the liquid mass into two volumes and these pistons having orifices therein of small diameter to provide communication between the two volumes of liquid in each cylinder. The fluid circuit conducts and returns liquid and air to and from the cylinders and the source. Flow control means are interposed in the circuit for controlling the fluid flow to and from the cylinders to automatically regulate the suspension of the vehicle and simultaneously regulate the liquid level in the cylinders. Operating means responsive to the changing load conditions of the vehicle are provided for actuating the control means and subordinating the activation thereof to the average fluctuations of the load conditions of the vehicle.

Specifically the pistons have a predetermined liquid level therein that corresponds to an assumed normal load. The system includes a reservoir that receives the liquid and air and an accumulator for receiving liquid and air from the reservoir. Conduit means extend between the reservoir and the accumulator. There is a conduit interconnecting the cylinders that are associated with the front wheel and a second conduit that interconnects the cylinders associated with the rear wheels. Each of these conduits extends within the cylinders and terminates approximately at the predetermined liquid level therein. A pair of flow distributors are included in the fluid circuit and connected respectively to the conduits that interconnect the cylinders of the front wheels and the conduits that interconnect the cylinders to the rear wheels. Further conduit means extends from each distributor to the accumulator. Additional conduit means connect each distributor to the reservoir below the liquid level therein and operating means that are responsive to changing load conditions of the vehicle are provided for actuating the distributors to place the cylinders in communication with the reservoir or the accumulator respectively, in accordance with the fluctuations of the suspension of the vehicle above or below a predetermined average value.

I claim:

1. A combination liquid-pneumatic suspension system for motor vehicles including a plurality of cylinders, said cylinders containing separate masses of liquid and air under pressure, a piston in each cylinder movable under the influence of load conditions of the vehicle and subdividing the liquid mass in each cylinder into two volumes, said pistons having orifices of small diameter therein providing communication between said two volumes of liquid in each cylinder, a common pressurized source of supply for the liquid and the air, a closed circuit including said cylinders, said source and conduits providing communication between the source of supply and the respective cylinders for the conduct thereto and return of liquid and air therefrom respectively, flow control means interposed in said circuit for controlling the fluid flow towards and from the cylinders to automatically regulate the suspension of the vehicle and simultaneously regulate the liquid level in the cylinders, and operating means responsive to changing load conditions for actuating the control means and subordinating the activation thereof to the average fluctuations of the load conditions of the vehicle.

2. A combination liquid-pneumatic suspension system for motor vehicles including a plurality of cylinders, said cylinders receiving separate masses of liquid and air under pressure, pistons in the cylinders adapted to be connected to the wheels of vehicles having front and rear load stabilizers and movable under the influence of load conditions of the vehicle, said pistons sub- dividing the liquid mass in each cylinder into two volumes and said pistons having orifices of small diameter therein providing communication between said two volumes of liquid in each cylinder, a common pressurized source of supply for the liquid and the air, a closed fluid circuit including said cylinders, said source and conduits providing communication between the source of supply and the respective cylinders for the conduct thereto and return of liquid and air therefrom respectively, flow control means interposed in said circuit controlling the fluid flow towards and from said cylinders to automatically regulate the suspension of the vehicle and simultaneously regulate the liquid level in the cylinders and operating means the control means responsive to changing load conditions for actuating and subordinating the activation thereof to the average fluctuation of the load conditions of the vehicle.

3. A combination liquid-pneumatic suspension system for motor vehicles including a plurality of cylinders, said cylinders receiving separate masses of liquid and air under pressure and having a predetermined liquid level corresponding to an assumed normal load, a piston in each cylinder movable under the influence of load conditions of the vehicle and sub-dividing the liquid mass in each cylinder into two volumes, each piston having orifices of small diameter therein providing communication between said two volumes of liquid, a reservoir receiving liquid and air, an accumulator for receiving liquid and air from said reservoir, conduit means between said reservoir and accumulator, conduits connected respectively to and extending within said cylinders approximately and terminating at the predetermined liquid level therein, a plurality of flow distributors, each distributor receiving the conduits to a plurality of cylinders, conduit means connecting each distributor with the accumulator, additional conduit means connecting each distributor with the reservoir below the liquid level therein, and operating means responsive to changing load conditions of the vehicle for actuating the distributors to put the cylinders into communication with the reservoir or with the accumulator respectively according to the fluctuation of the suspension of the vehicle above or below a predetermined average value.

4. A combination liquid-pneumatic suspension system for motor vehicles including a plurality of cylinders, a piston in each cylinder movable under the influence of load conditions of the vehicle, said cylinders receiving separate masses of liquid and air under pressure and having a predetermined liquid level corresponding to an assumed normal load, a reservoir receiving liquid and air, an accumulator for receiving liquid and air from said reservoir, conduit means between said reservoir and accumulator, a conduit interconnecting the cylinders for the front wheels, a second conduit interconnecting the cylinders for the rear wheels, each conduit extending within the cylinders and terminating approximately at said predetermined liquid level therein, a pair of flow distributors connected respectively to the conduits interconnecting the cylinders for the front wheels and to the conduits interconnecting the cylinders for the rear wheels, conduit means extending from each distributor to the accumulator, additional conduit means connecting each distributor to the reservoir below the liquid level therein, and operating means responsive to changing load conditions of the vehicle for actuating the distributors to put the cylinders into communication with the reservoir or the accumulator respectively, according to the fluctuation of the suspension of the vehicle above or below a predetermined average value.

5. A combination liquid-pneumatic suspension system for motor vehicles including a plurality of cylinders, a piston in each cylinder movable under the influence of load conditions of the vehicle, said cylinders receiving separate masses of liquid and air under pressure and having a predetermined liquid level therein corresponding to an assumed normal load, a reservoir receiving liquid and air, an accumulator for receiving liquid and air from said reservoir, a compressor, conduits connecting the reservoir to the compressor and the compressor to the accumulator, conduits connected respectively to and extending within said cylinders and terminating approximately at the predetermined liquid level therein, a plurality of flow distributors, each distributor receiving the conduits to a plurality of cylinders, conduit means connecting each distributor with the accumulator, conduit means connecting each distributor with the reservoir below the liquid level therein, and operating means responsive to changing load conditions of the vehicle for actuating the distributors to put the cylinders into communication with the reservoir or with the accumulator respectively according to the fluctuation of the suspension of the vehicle above or below a predetermined average value.

6. A combination liquid-pneumatic suspension system for motor vehicles according to claim 5, in which the conduit from the compressor to the liquid and air reservoir terminates within the latter in a flared mouth, said conduit determining the level of the liquid in the reservoir.

7. A combination liquid-pneumatic suspension system for motor vehicles including a plurality of cylinders, a piston in each cylinder movable under the influence of load conditions for the vehicle, said cylinders receiving separate masses of liquid and air under pressure and having a predetermined liquid level therein corresponding to an assumed normal load, a reservoir receiving liquid and air, an accumulator for receiving liquid and air from said reservoir, a compressor, conduits connecting the reservoir to the compressor and the compressor to the accumulator, conduits connected respectively to and extending within said cylinders and terminating approximately at the predetermined liquid level therein, a plurality of flow distributors, each distributor receiving the conduits to a plurality of cylinders, conduit means connecting each distributor with the reservoir below the liquid level therein, operating means responsive to changing load conditions of the vehicle for actuating the distributors to put the cylinders into communication with the reservoir or with the accumulator respectively according to the fluctuation of the suspension of the vehicle above or below a predetermined average value, the conduit from the compressor to the liquid and air reservoir terminates within the latter in a flared mouth having a serrated edge, said conduit determining the level of the liquid in the reservoir.

8. A combination liquid-pneumatic suspension system for motor vehicles including a plurality of cylinders, said cylinders receiving separate masses of liquid and air under pressure and having a predetermined liquid level corresponding to an assumed normal load, a reservoir receiving liquid and air, an accumulator for receiving liquid and air from said reservoir, conduit means between said reservoir and accumulator, conduits connected respectively to and extending within said cylinders and terminating approximately at the predetermined liquid level therein, a plurality of flow distributors, each distributor receiving the conduits to a plurality of cylinders, conduit means connecting each distributor with the accumulator, additional conduit means connecting each distributor with the reservoir below the liquid level therein, operating means responsive to changing load conditions of the vehicle for actuating the distributors to put the cylinders into communication with the reservoir or with the accumulator respectively according to the fluctuation of the suspension of the vehicle above or below a predetermined average value, the conduits from the distributors to the cylinders terminating in extensions within the cylinders, a foraminous member forming with the walls of the cylinders enclosures for the extensions of the conduits, said conduits determining the level of the liquid in the cylinders.

9. A combination liquid-pneumatic suspension system for motor vehicles including a plurality of cylinders, a piston in each cylinder movable under the influence of load conditions of the vehicle, said cylinders receiving separate masses of liquid and air under pressure and having a predetermined liquid level therein corresponding to an assumed normal load, a reservoir receiving liquid and air, an accumulator for receiving liquid and air from said reservoir, conduit means between said reservoir and accumulator, conduit means connected respectively to and extending within said cylinders and terminating at the predetermined liquid level therein, a plurality of flow distributors, each distributor receiving the conduit tube, a plurality of cylinders, conduit means connecting each distributor with the accumulator, additional conduit means connecting each distributor with the reservoir below the liquid level therein, operating means responsive to change in load conditions of the vehicle for actuating the distributor to place the cylinders into communication with the reservoir or with the accumulators respectively according to the fluctuation of the suspension of the vehicle above or below a predetermined average value, each piston in the said cylinders having a flange gliding with free engagement within the cylinder walls and dividing the liquid mass in said cylinder into two volumes, said flange having therein a first orifice of small diameter, a flap valve over said orifice and closing same in one direction of reciprocation of the piston, and said flange having a second orifice therein of larger diameter, and a flap valve mounted over said second orifice, a wedge beneath said valve, said latter flap valve restricting flow through the second orifice in the opposite direction of reciprocation of the piston.

10. A combination liquid-pneumatic suspension system for motor vehicles including a plurality of cylinders, a piston in each cylinder movable under the influence of load conditions of the vehicle, said cylinders receiving separate masses of liquid and air under pressure and having a predetermined liquid level therein corresponding to an assumed normal load, a reservoir receiving liquid and air, an accumulator for receiving liquid and air from said reservoir, conduit means between said reservoir and accumulator, conduit means connected respectively to and extending within said cylinders and terminating at the predetermined liquid level therein, a plurality of flow distributors, each distributor receiving the conduit tube, a plurality of cylinders, conduit means connecting each distributor with the accumulator, additional conduit means connecting each distributor with the reservoir below the liquid level therein, operating means responsive to change in load conditions of the vehicle for actuating the distributor to place the cylinders into communication with the reservoir or with the accumulators respectively according to the fluctuation of the suspension of the vehicle above or below a predetermined average value, each cylinder having a diametrically positioned partition therein dividing the liquid mass within the cylinder into two volumes, said partition having a central hole slidably receiving the piston, and an orifice therethrough, a flap valve controlling flow through said orifice, and each piston having a flange extending radially thereof and gliding with free engagement within the cylinder wall and subdividing the liquid mass on one side of said partition into two volumes, said flange having therein a first orifice of small diameter, a flap valve over said orifice and closing same in one direction of reciprocation of the piston, said flange having a second orifice therein of larger diameter, and a flap valve mounted over said second orifice, a wedge beneath said second flap valve, said latter flap valve restricting flow through the second orifice in the opposite direction of reciprocation of the piston.

11. A combination liquid-pneumatic suspension system for motor vehicles including a plurality of cylinders, a piston in each cylinder movable under the influence of load conditions of the vehicle, said cylinders receiving separate masses of liquid and air under pressure and having a predetermined liquid level therein corresponding to an assumed normal load, a reservoir receiving liquid and air, an accumulator for receiving liquid and air from said reservoir, conduit means between said reservoir and accumulator, conduit means connected respectively to and extending within said cylinders and terminating at the predetermined liquid level therein, a plurality of flow distributors, each distributor receiving the conduit tube, a plurality of cylinders, conduit means connecting each distributor with the accumulator, additional conduit means connecting each distributor with the reservoir below the liquid level therein, operating means responsive to change in load conditions of the vehicle for actuating the distributor to place the cylinders into communication with the reservoir or with the accumulators respectively according to the fluctuation of the suspension of the vehicle above or below a predetermined average value, each cylinder having a lower partition plate spaced inwardly from one end, said lower partition plate having a central hole therethrough closely receiving the piston in sliding engagement, a packing in said central hole in the lower partition plate and engaging said piston, a closure plate spaced outwardly from the lower partition plate and forming an oil chamber with the latter, said closure plate having a central hole closely receiving the piston in sliding engagement, a packing in the central hole in the closure plate engaging the piston, and an oil conduit connected to said cylinder in the oil chamber intermediate the lower partition plate and the closure plate and extending to the source of supply of the liquid and air and communicating therewith below the liquid level therein.

12. A combination liquid-pneumatic suspension system for motor vehicles including a plurality of cylinders, a piston in each cylinder movable under the influence of load conditions of the vehicle, said cylinders receiving separate masses of liquid and air under pressure and having a predetermined liquid level therein corresponding to an assumed normal load, a reservoir receiving liquid and air, an accumulator for receiving liquid and air from said reservoir, conduit means between said reservoir and accumulator, conduit means connected respectively to and extending within said cylinders and terminating at the predetermined liquid level therein, a plurality of flow distributors, each distributor receiving the conduit tube, a plurality of cylinders, conduit means connecting each distributor with the accumulator, additional conduit means connecting each distributor with the reservoir below the liquid level therein, operating means responsive to change in load conditions of the vehicle for actuating the distributor to place the cylinders into communication with the reservoir or with the accumulators respectively according to the fluctuation of the suspension of the vehicle above or below a predetermined average value, each cylinder having a longitudinal groove in the inner wall and each piston is provided with a flange gliding with free engagement with the cylinder wall and moving between the ends of said longitudinal groove, said flange dividing the liquid mass in said cylinder into two volumes, said flange having therein a first orifice of small diameter, a flap valve over said orifice and closing same in one direction of reciprocation of the piston, and said flange having a second orifice therein of larger diameter, a flap valve mounted over said second orifice, a wedge beneath said second flap valve and, said latter flap valve restricting flow through the second orifice in the opposite direction of reciprocation of the piston.

13. A combination liquid-pneumatic suspension system for motor vehicles including a plurality of cylinders, a piston in each cylinder movable under the influence of load conditions of the vehicle, said cylinders receiving separate masses of liquid and air under pressure and having a predetermined liquid level therein corresponding to an assumed normal load, a reservoir receiving liquid and air, an accumulator for receiving liquid and air from said reservoir, conduit means between said reservoir and accumulator, conduit means connected respectively to and extending within said cylinders and terminating at the predetermined liquid level therein, a plurality of flow distributors, each distributor receiving the conduit tube, a plurality of cylinders, conduit means connecting each distributor with the accumulator, additional conduit means connecting each distributor with the reservoir below the liquid level therein, operating means responsive to change in load conditions of the vehicle for actuating the distributor to place the cylinders into communication with the reservoir or with the accumulators respectively according to the fluctuation of the suspension of the vehicle above or below a predetermined average value, and in which the cylinders are positioned horizontally and each cylinder has a diametrically positioned partition with a flat cylindrical cavity therein and dividing the liquid mass within the cylinder into two volumes, said partitions having a central hole slidably receiving the piston, annular packings mounted in the central hole in the partition on either side of the cylindrical cavity therein and engaging the piston, said partition having an orifice therethrough communicating with the cylindrical cavity, a flap valve controlling flow through said orifice, and each piston being provided with a flange gliding with free engagement with the cylinder wall and subdividing the liquid mass on one side of said partition into two volumes, said flange having therein a first orifice, a flap valve over said orifice and closing same in one direction of reciprocation of the piston, said flange having a second orifice therein of larger diameter, and a flap valve mounted over said second orifice, a wedge beneath said second flap valve and, said latter flap valve restricting flow through the second orifice in the opposite direction of reciprocation of the piston.

14. A combination liquid-pneumatic suspension system for motor vehicles including a plurality of cylinders, a piston in each cylinder movable under the influence of load conditions of the vehicle, said cylinders receiving separate masses of liquid and air under pressure and having a predetermined liquid level therein corresponding to an assumed normal load, a reservoir receiving liquid and air, an accumulator for receiving liquid and air from said reservoir, conduit means between said reservoir and accumulator, conduit means connected respectively to and extending within said cylinders and terminating at the predetermined liquid level therein, a plurality of flow distributors, each distributor receiving the conduit tube, a plurality of cylinders, conduit means connecting each distributor with the accumulator, additional conduit means connecting each distributor with the reservoir below the liquid level therein, operating means responsive to change in load conditions of the vehicle for actuating the distributor to place the cylinders into communication with the reservoir or with the accumulators respectively according to the fluctuation of the suspension of the vehicle above or below a predetermined average value, each cylinder having a lower partition plate spaced inwardly from one end, said lower partition plate having a central hole therethrough closely receiving the piston in sliding engagement, a packing in said central hole in the lower partition plate and engaging said piston, a closure plate spaced outwardly from the lower partition plate and forming an oil chamber with the latter, said closure plate having a central hole closely receiving the piston in sliding engagement, a packing in the central hole in the closure plate engaging the piston, liquid conduits connected to said cylinders in the oil chamber intermediate the lower partition plate and the closure plate and interconnecting said cylinders, and return conduits connecting said liquid conduits to the source of supply of the liquid and air and communicating therewith below the liquid level therein.

RENÉ LUCIEN LEVY,
*Also known as René Lucien.*

References Cited in the file of this patent

UNITED STATES PATENTS

| Number | Name | Date |
|---|---|---|
| 1,037,730 | Cowey | Sept. 3, 1912 |
| 1,974,171 | Bizzarri | Sept. 18, 1934 |
| 1,990,517 | Bedford et al. | Feb. 12, 1935 |
| 2,056,106 | Kuhn | Sept. 29, 1936 |
| 2,115,072 | Hunt | Apr. 26, 1938 |
| 2,387,249 | Eddington | Oct. 23, 1945 |
| 2,506,726 | Magrum | May 9, 1950 |